United States Patent
Lanubile et al.

(10) Patent No.: US 12,530,934 B2
(45) Date of Patent: Jan. 20, 2026

(54) METHOD FOR GENERATING AN APPLICATION FILE FOR A VEHICULAR CONTROL UNIT AND METHOD FOR TRANSFERRING THE APPLICATION FILE OBTAINED TO THE VEHICULAR CONTROL UNIT

(71) Applicant: CNH Industrial America LLC, New Holland, PA (US)

(72) Inventors: Remigio Lanubile, Turin (IT); Enrico Busi, Turin (IT); Marco Formaggio, Turin (IT)

(73) Assignee: CNH Industrial America LLC, New Holland, PA (US)

( * ) Notice: Subject to any disclaimer, the term of this patent is extended or adjusted under 35 U.S.C. 154(b) by 389 days.

(21) Appl. No.: 18/028,422

(22) PCT Filed: Sep. 27, 2021

(86) PCT No.: PCT/EP2021/076432
§ 371 (c)(1),
(2) Date: Mar. 24, 2023

(87) PCT Pub. No.: WO2022/064020
PCT Pub. Date: Mar. 31, 2022

(65) Prior Publication Data
US 2023/0368592 A1     Nov. 16, 2023

(30) Foreign Application Priority Data
Sep. 25, 2020   (IT) .................. 102020000022709

(51) Int. Cl.
*G07C 5/08*     (2006.01)
*G06F 11/10*    (2006.01)

(52) U.S. Cl.
CPC .......... *G07C 5/085* (2013.01); *G06F 11/1004* (2013.01); *G07C 5/0808* (2013.01)

(58) Field of Classification Search
CPC .... G07C 5/085; G07C 5/0808; G06F 11/1004
See application file for complete search history.

(56) References Cited

FOREIGN PATENT DOCUMENTS

KR    20180039387 A    4/2018

OTHER PUBLICATIONS

Schmidgall, Ralf, "Automotive embedded systems software reprogrammin", Thesis Brunel University, May 2012, XP055740262, https://bura.brunel.ac.uk/bitstream/2438/7070/1/FulltextThesis.pdf, 230 pgs.
IT Search Report for Application No. IT/2020/00022709, dated May 14, 2021, 8 pgs.

*Primary Examiner* — Aryan E Weisenfeld
(74) *Attorney, Agent, or Firm* — Fletcher Yoder, P.C.

(57) ABSTRACT

Method of generating an application file containing instructions for a vehicle ECU, the application file (Appfile) comprising a first header (AAH) comprising at least one field showing a CRC value calculated on the entire application file, an executable portion (Application), the method comprising a step (Step 1) of generating a modified application file (Appfile*) comprising said first header (AAH), unaltered, and the executable portion (Application*) compressed by means of a lossless compression algorithm.

10 Claims, 3 Drawing Sheets

METHOD FOR GENERATING AN APPLICATION FILE FOR A VEHICULAR CONTROL UNIT AND METHOD FOR TRANSFERRING THE APPLICATION FILE OBTAINED TO THE VEHICULAR CONTROL UNIT

CROSS-REFERENCE TO RELATED APPLICATIONS

This application is a national stage of PCT Application No. PCT/EP2021/076432, entitled "METHOD FOR GENERATING AN APPLICATION FILE FOR A VEHICULAR CONTROL UNIT AND METHOD FOR TRANSFERRING THE APPLICATION FILE OBTAINED TO THE VEHICULAR CONTROL UNIT", filed Sep. 27, 2021, which claims priority from and the benefit of IT application No. 102020000022709, filed Sep. 25, 2020. Each of the foregoing applications is hereby incorporated by reference in its entirety.

FIELD OF THE INVENTION

The present invention relates to the field of programming vehicle control units, in particular earth-moving machines and work machines.

STATE OF THE ART

In the context of vehicle control units programming, a so called "diagnostic tool" is generally used, i.e. a computer comprising interface means compatible with a vehicle network to which the control unit is operationally associated. Typically, the OBD/OBD2 socket is used to connect the diagnostic tool to the vehicle network.

The diagnostic tool, generally supplied to workshops, for simplicity "tool", performs some fundamental operations, including checking the compatibility between the application file previously stored in a static memory of the tool and the hardware of the control unit to be transferred to.

The application file consists of an executable portion, hereinafter referred to as application and a relative header hereinafter referred to as AAH by the acronym "App Admin header".

Some information is contained in a further header called "Textual Header for Diagnostics Tool" hereinafter referred to as THDT for convenience. This header, together with the application file defines the so-called "package".

The THDT contains a number of instructions. An instruction indicates the portion (Appfile) of the file (PackApp) to be loaded, the memory address of the control unit to be written and any commands that the tool must execute or submit to the control unit via UDS communication protocol acronym of "Unified Diagnostic Services" (Unified diagnostic services) used in vehicle control units in accordance with the ISO 14229-1 standard.

The package (PackApp) stored in the tool memory, therefore includes the aforementioned THDT header and the application file(s) (Appfile) to be loaded, but the THDT header, unlike the application file, is not loaded into the control unit, as it relates solely to the transfer instructions.

The application file is generally in hexadecimal format (HEX) and in the AAH is stored
 the CRC, i.e. a value indicating the so-called "cyclic redundancy check" which certifies the integrity of the application file itself, in addition to
 information about the compatibility between the application file and the hardware of the control unit receiving the transfer of the application file.

The package containing TDHT+AAH+application is generally formatted in hx2 format or another equivalent format. The "+" symbols indicate data queuing.

The tool, therefore, is configured to read the information contained in both THDT and AAH, to interrogate the vehicle control unit using the UDS protocol and to verify the compatibility between hardware and software and the integrity of the application file and if the checks are positive it proceeds to transfer the application file in accordance with THDT instructions.

During the transfer, the tool issues commands to the ECU (boot loader) about, for example, the non-volatile memory allocation in which the application file must be written. Data transfer takes a very long time due to the intrinsic characteristics of vehicular CAN networks. Although vehicle processing units, nowadays, have large computing capabilities, the transfer of these application files can take up to 30 minutes or more. It is evident that the greater the transfer time, the greater the probability that an external disturbance could lead to the failure of the loading procedure itself with the risk of the control unit damage.

The UDS protocol provides for the transfer of compressed files, but this is not useful, since, by compressing the application file, the tool can no longer perform the aforementioned compatibility checks, which are essential for safeguarding the integrity of the vehicle control units.

On the other hand, such a long data transfer time is not acceptable, both during the maintenance of a vehicle, and especially along with the production chain of the same vehicle. If not specifically excluded in the detailed description that follows, what is described in this chapter is to be considered as an integral part of the detailed description.

SUMMARY OF THE INVENTION

The object of the present invention is to make the transfer of application files faster without sacrificing the safety conferred by the known loading systems described above.
 The basic idea of the present invention is
 generating an application file in which AHH contains the CRC of the same application file,
 separating the AAH header from the application,
 compressing the application using a known lossless algorithm,
 composing the package including THDT+AAH+application, and
 inhibition the tool from checking the CRC on the application file.

The THDT is built in such a way as to instruct the vehicle ECU to write the AAH and the decompressed application sequentially in the non-volatile memory of the same and so as to check the CRC at the end of the of both writings. In other words, it is selectively compressed a part of the package and prevented the tool from verifying the integrity of the application file through CRC. This fact implies that the THDT is configured to indicate the separate transfer of the AAH and the application, specifying that the application is compressed, and making sure that once written in the non-volatile memory of the vehicle ECU, the AAH and its decompressed application are written consequentially. Thus, the control unit can verify the CRC of the entire application file in a transparent way with respect to the compression/decompression procedures.

In other words, until decompression, AAH and application are treated as two separate data streams, while the original application file is recomposed after its writing in the non-volatile memory of the vehicle ECU.

Advantageously, the loading times of the application file are reduced even by 70% with a considerable saving of time and a significant reduction in the risk of corruption of the transferred file.

Preferably, the application is previously converted into binary format before being compressed, therefore, the vehicle control unit, after decompressing the application, reconverts it to hexadecimal format.

The dependent claims describe preferred variants of the invention, forming an integral part of this description.

BRIEF DESCRIPTION OF THE FIGURES

Further objects and advantages of the present invention will become clear from the following detailed description of an example of its embodiments (and its variants) and from the annexed drawings given purely by way of nonlimiting explanation, in which.

Figure 8:
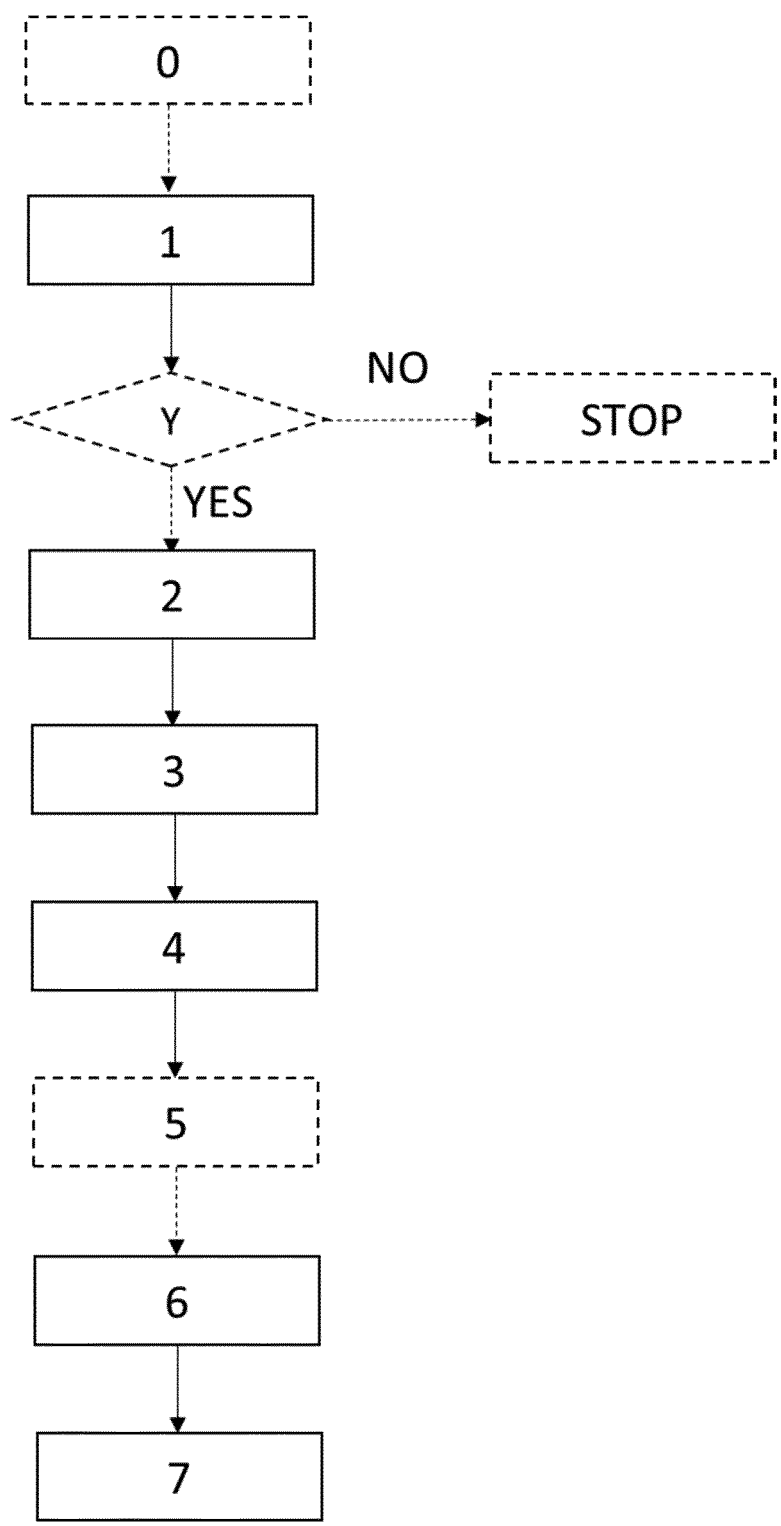
FIG. 8 shows a complete flow chart of the present invention, in which the dotted blocks are optional.

It is worth pointing out that some steps of the diagram of FIG. 8 are performed by a first processing unit while other steps are performed by at least a second processing unit.

The same reference numbers and letters in the figures identify the same elements or components or functions.

It should also be noted that the terms "first", "second", "third", "upper", "lower" and the like can be used here to distinguish various elements. These terms do not imply a spatial, sequential or hierarchical order for the modified elements unless it is specifically indicated or inferred from the text.

The elements and features illustrated in the various preferred embodiments, including the drawings, can be combined with each other without however departing from the scope of the present application as described below.

DETAILED DESCRIPTION OF EXEMPLARY EMBODIMENTS

Figure 1:
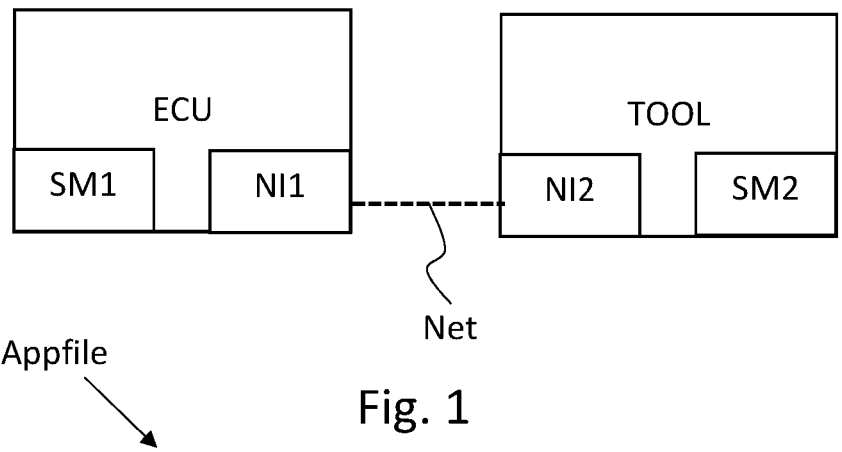
FIG. 1 schematically shows the interfacing of a diagnostic tool with a vehicle control unit.

FIG. 1 represents the hardware infrastructure generally used to transfer an application file to a vehicle ECU. This comprises processing means, a static memory SM1, i.e. non-volatile, in addition obviously to a volatile memory (RAM) not indicated and interface means NI1, generally of the CAN or LIN type.

The diagnostic tool, Tool, also includes processing means, an SM2 static memory in addition to volatile memory and a NI2 network interface that allows the tool to interface with the vehicle ECU through, for example, the OBD socket of the vehicle data network.

Although the vehicle control unit is indicated with the initials ECU generally to indicate the engine control units, this can be any on-board processing unit, such as, for example, the so-called VCU vehicle control unit, etc. As known, the tool can perform various operations, from reading the faults stored in the ECU to programming the control unit itself.

Figure 2:
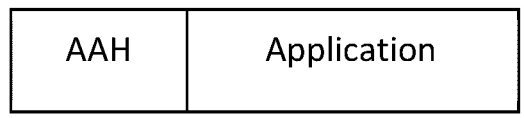
FIGS. 2-6 show the data structures through which an application is transferred to a vehicle control unit.
Figure 3:
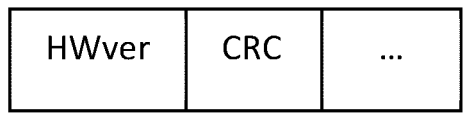
Figure 4:
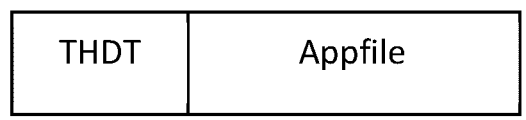
Figure 6:
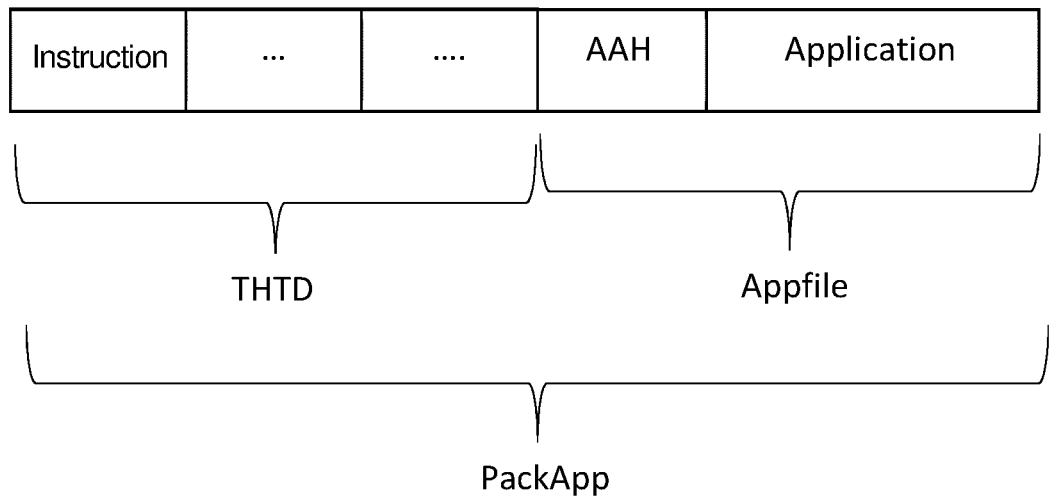

The control unit is generally equipped with a so-called boot loader, that is a firmware which, when the control unit is turned on, loads the operating instructions from the static memory SM1 into the volatile memory of the same. The application file containing these instructions is indicated with Appfile and includes an Application portion containing the instructions themselves and a relative first header AAH, see FIG. 2, containing at least one field indicating a CRC value necessary to check the integrity of the application file before and/or after its transfer from SM2 memory to SM1 memory. The first heading AAH, see FIG. 3, generally also includes a second HWver field necessary to contain a value indicating a hardware and/or boot loader version of the vehicle ECU to which the application file is intended. Generally, but not necessarily, the application file is encapsulated in a so-called package, here called PackApp, see FIGS. 4 and 6, which includes a second header THDT which contains the necessary instructions during the transfer of the application file from the tool to the vehicle control unit.

A typical containing instruction in the THDT is formatted as follows:

DOWNLOAD=2.5, 0x81800000, 0x8180007F, 0xFF8 where

0x81800000 indicates the first memory allocation to be written,

0x8180007F indicates the last memory allocation to be written, etc.

Figure 5:

FIG. 5 shows the field Instruction1 which indicates an instruction intended for the diagnostic tool that manages the control unit subject of the transfer.

Figure 7:
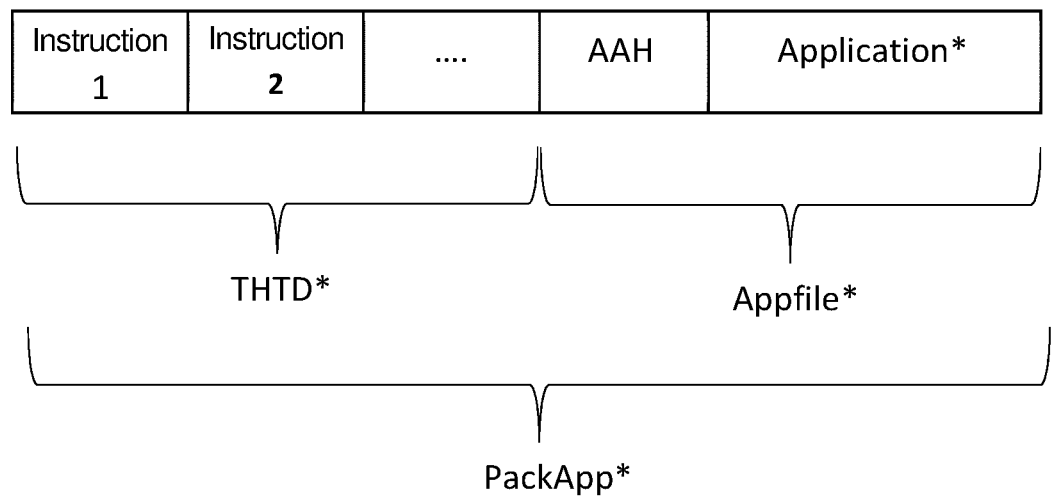
FIG. 7 shows a modified data structure according to the present invention.

According to the present invention, schematized with the help of FIG. 7, the application file, whose CRC refers to the integrity of the entire application file, is broken up into header and application portion and the application portion is compressed (Step 1), with a possible prior conversion (Step 0) from hexadecimal to binary format, thus obtaining a modified application file Appfile*, where the header is unaltered, but the application portion is compressed.

Compression is performed by a lossless algorithm, preferably LZMA.

The package is now further modified so that the transfer does not concern the entire modified application file Appfile* but its distinct portions AAH and Application*.

In this way, there are two essential advantages:

the Tool can freely access the fields of the first header AAH, for example to acquire HWver, and make sure (Step Y) the compatibility of the application file with the ECU to be programmed, it is possible to selectively specify to the control unit that, after the transfer of the second data stream to the relative volatile memory, this must be decompressed before being written to the non-volatile memory.

In addition, in the fields Instruction1, Instruction2 are made so that the writing of AAH and Appfile takes place in consecutive memory allocations of the vehicle ECU so that for the control unit the segmentation of the application file and its writing at several times is transparent.

Thus, once written, the control unit can verify its integrity using the relating CRC.

As mentioned above, the presence of the second header THDT essentially depends on the diagnostic tool. In fact, the tool can itself be configured, by means of its firmware, to manipulate the application file from Appfile to Appfile* and manage the separate transfer of the AAH and Application* portions.

As illustrated, the present invention relates to a method for generating an application file containing instructions for a vehicle control unit. The application file (Appfile) includes a first header (AAH) comprising at least one field showing a CRC value calculated on the entire application file, an executable portion (Application), the method comprising a step (Step 1) to generate a modified application file (Appfile*) comprising said first header (AAH), unaltered, and the executable portion (Application*) compressed by means of a lossless compression algorithm. Preferably, when the application file is in hexadecimal format then the generation of the modified application file comprises the preliminary step (Step 0) of converting only the executable portion of the file (Application) into binary format.

The invention also relates to a method of generating an application package (PackApp*) for a diagnostic tool (TOOL) configured to verify the compatibility (Step Y) of the application package with the vehicle control unit. The method comprises a second step (Step 2) to put before said modified application file (Appfile*), according to the above, a second header (THDT*) containing instructions to cause
   the transfer (Step 3) of said application file (Appfile*) modified through two distinct transfers respectively of said first header (AHH) and said executable portion (Application*) compressed, and to cause
   the execution of the following steps by the vehicle control unit:
      (Step 4) prior decompression of the compressed executable portion (Application*)
      (Step 6) storage, in a first non-volatile memory (SM1) of the vehicle control unit, of the executable portion (Application), decompressed, consecutively to said first header (AHH).

The invention, with reference to FIG. 8, also concerns a method for transferring an application file to a vehicle control unit using a diagnostic tool. The application file (Appfile), as described above, includes
   a first header (AAH) comprising at least one field showing a CRC value calculated on the entire application file,
   an executable portion (Application), the method including the following steps:
   (Step 1) compression of the executable portion only (Application*) using a lossless compression algorithm, for example LZMA,
   (Step Y) verification of the compatibility of the application package with the vehicle control unit by comparing information obtained from the vehicle control unit and contained in the first heading (AHH),
   (Step 2) putting a second header (THDT*) before, said modified application file (Appfile*), the second header containing instructions to cause
   the transfer (Step 3) of said modified application file (Appfile*) through two distinct transfers respectively of said first header (AHH) and said executable compressed portion (Application*), and to cause
   the execution of the following steps by the vehicle control unit:
      (Step 4) prior decompression of the compressed executable portion (Application*) and
      (Step 6) storage, in a first non-volatile memory (SM1) of the vehicle control unit, of the executable portion (Application), decompressed, consecutively to said first header (AHH).

The method further includes the step (Step 7) of verifying the integrity of the application file written in the non-volatile memory (SM1) of the vehicle control unit (ECU) by the vehicle control unit itself using said CRC.

Preferably, it is expected to cause the diagnostic tool to be inhibited, at least temporarily, by verifying the integrity of the modified application file (Appfile*) using said CRC. This inhibition can for example be controlled by means of a field contained in the THDT.

The present invention also relates to a system suitable for autonomously analysing an application file and automatically manipulating it as described above, in order to compress only the application portion.

The present invention also relates to a diagnostic tool containing, in a relative static memory SM2, an application file manipulated according to the present invention.

Furthermore, the present invention also relates to a memory medium containing an application file, which when executed by a vehicle control unit, causes the separate transfer (Step 3) of a first data stream (AHH) in uncompressed format containing a value of CRC and a second compressed data stream (Application*) and the storage (Step 6) of the second data stream, previously decompressed (Step 4) by the vehicle control unit, in a first non-volatile memory (SM1) of the vehicle control unit, consecutively to said first data flow so as to define an application file (Appfile) and the verification (Step 7) of the integrity of the application file written in the memory (SM1) by means of said CRC value.

The present invention can be advantageously realized by means of a computer program which comprises coding means for carrying out one or more steps of the method, when this program is executed on a computer. Therefore it is intended that the scope of protection extends to said computer program and further to computer readable means comprising a recorded message, said computer readable means comprising program coding means for carrying out one or more steps of the method, when said program is run on a computer.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

The invention claimed is:

1. A method of generating an application package for a diagnostic tool configured to check compatibility of the application package with a vehicle control unit, the method comprising:
   generating, via a processor of the diagnostic tool, a modified application file from an application file, wherein:
      the application file comprises a first header comprising at least one field showing a cyclic redundancy check (CRC) value calculated on an entirety of the application file, and an executable portion;
      the executable portion comprises instructions for the vehicle control unit; and
      the modified application file comprises the first header, unaltered, and the executable portion, compressed, using a lossless compression algorithm; and
   putting, via the processor of the diagnostic tool, a second header forward of the modified application file, the second header containing instructions to cause transfer of the modified application file through two distinct transfers respectively of the first header and the executable portion, compressed, to enable execution of the following steps by the vehicle control unit:
      decompression of the executable portion, compressed; and storage, in a non-volatile memory of the vehicle control unit, of the executable portion, decompressed, consecutively to the first header.

2. A transfer method of an application file to a vehicle control unit using a diagnostic tool, the application file including:
   a first header comprising at least one field showing a cyclic redundancy check (CRC) value calculated on the entire application file; and
   an executable portion;
   wherein the transfer method includes the following steps:
   compressing, via a processor of the diagnostic tool, the executable portion only using a lossless compression algorithm to generate a modified application file;
   verifying, via the processor of the diagnostic tool, compatibility of the application package file with the vehicle control unit by comparing information obtained from the vehicle control unit and contained in the first header;
   putting, via the processor of the diagnostic tool, a second header forward of the modified application file, the second header containing instructions to cause transfer of the modified application file through two distinct transfers respectively of the first header and the executable portion, compressed, to enable execution of the following steps by the vehicle control unit:
   decompression of the executable portion, compressed; and
   storage, in a non-volatile memory of the vehicle control unit, of the executable portion, decompressed, consecutively to the first header.

3. The transfer method according to claim 2, wherein the vehicle control unit is configured to verify integrity of the application file written stored in the non-volatile memory of the vehicle control unit by means of the CRC value.

4. The transfer method according to claim 2, further comprising converting, via the processor of the diagnostic tool, the executable portion from hexadecimal format to binary format of the executable portion before the compression compressing the executable portion.

5. The transfer method according to claim 2, further comprising a process of at least temporary inhibiting, via the processor of the diagnostic tool, the diagnostic tool from verifying integrity of the modified application file by means of the CRC value.

6. The transfer method according to claim 2, verifying the compatibility of the application package file with the vehicle control unit comprises:
   acquiring a first value indicating a hardware and/or boot loader version of the vehicle control unit;
   reading at least a second value of a field of the first header;
   comparing the first value with the second value, and in positive case, the application file is considered as compatible with the vehicle control unit, while in negative case interruption of the transfer method.

7. A non-transitory computer readable medium including instructions which, when executed by a vehicle control unit, cause;
   separate transfer of a first data stream in an uncompressed format containing a cyclic redundancy check (CRC) value and a second compressed data stream;
   storage of the second compressed data stream, previously decompressed by the vehicle control unit, in a non-volatile memory of the vehicle control unit, consecutively to the first data stream in order to define an application file; and
   verification of integrity of the application file written in the first volatile memory by means of the CRC value.

8. The transfer method according to claim 4, wherein the vehicle control unit is configured to convert the executable portion, decompressed, from binary format to hexadecimal format before the storage in the non-volatile memory of the vehicle control unit.

9. The method according to claim 1, wherein the application file is in hexadecimal format, and generating the modified application file comprises a preliminary step of converting only the executable portion into binary format.

10. The method according to claim 1, wherein the first header further comprises at least one field for a value indicating a hardware and/or boot loader version of the vehicle control unit to which the application file is intended.

* * * * *